United States Patent [19]

Yevick

[11] 4,007,985
[45] Feb. 15, 1977

[54] MULTIPLE FUNCTION RECORDING AND READOUT SYSTEM
[75] Inventor: George Johannus Yevick, Leonia, N.J.
[73] Assignee: Personal Communications, Inc., Stamford, Conn.
[22] Filed: Oct. 16, 1974
[21] Appl. No.: 515,344
[52] U.S. Cl. .............. 355/46; 240/1 EL; 353/38; 353/120; 354/102
[51] Int. Cl.² .............. B60Q 3/04; G03B 21/14; G03B 23/08; G03B 33/14
[58] Field of Search ........ 353/120, 38, 27 A, 27 R; 355/46; 240/1 EL, 1 LP; 354/101, 102, 110, 125, 118

[56] References Cited
UNITED STATES PATENTS

| 1,746,584 | 2/1930 | Fournier | 354/102 |
| 2,095,826 | 10/1937 | Miller | 354/102 X |
| 2,202,354 | 5/1940 | Saint Genies | 354/102 |
| 2,203,651 | 6/1940 | Capstaff | 354/102 X |
| 3,267,826 | 8/1966 | Browning | 354/110 |
| 3,605,593 | 9/1971 | Anderson | 354/46 |
| 3,752,974 | 8/1973 | Baker et al. | 240/1 |
| 3,824,609 | 7/1974 | Yevick | 354/102 |
| 3,947,189 | 3/1976 | Huignard | 353/38 |

Primary Examiner—Donald A. Griffin
Attorney, Agent, or Firm—Thomas J. Greer, Jr.

[57] ABSTRACT

A plural function optical apparatus defined by first and second parallel lensfiche elements positioned with their emulsion sides facing each other and first and second parallel optical screens each spaced from and parallel to a respective face of the lensfiche. Two lighting sheet elements may be added to increase the number of functions (projection, recording).

5 Claims, 16 Drawing Figures

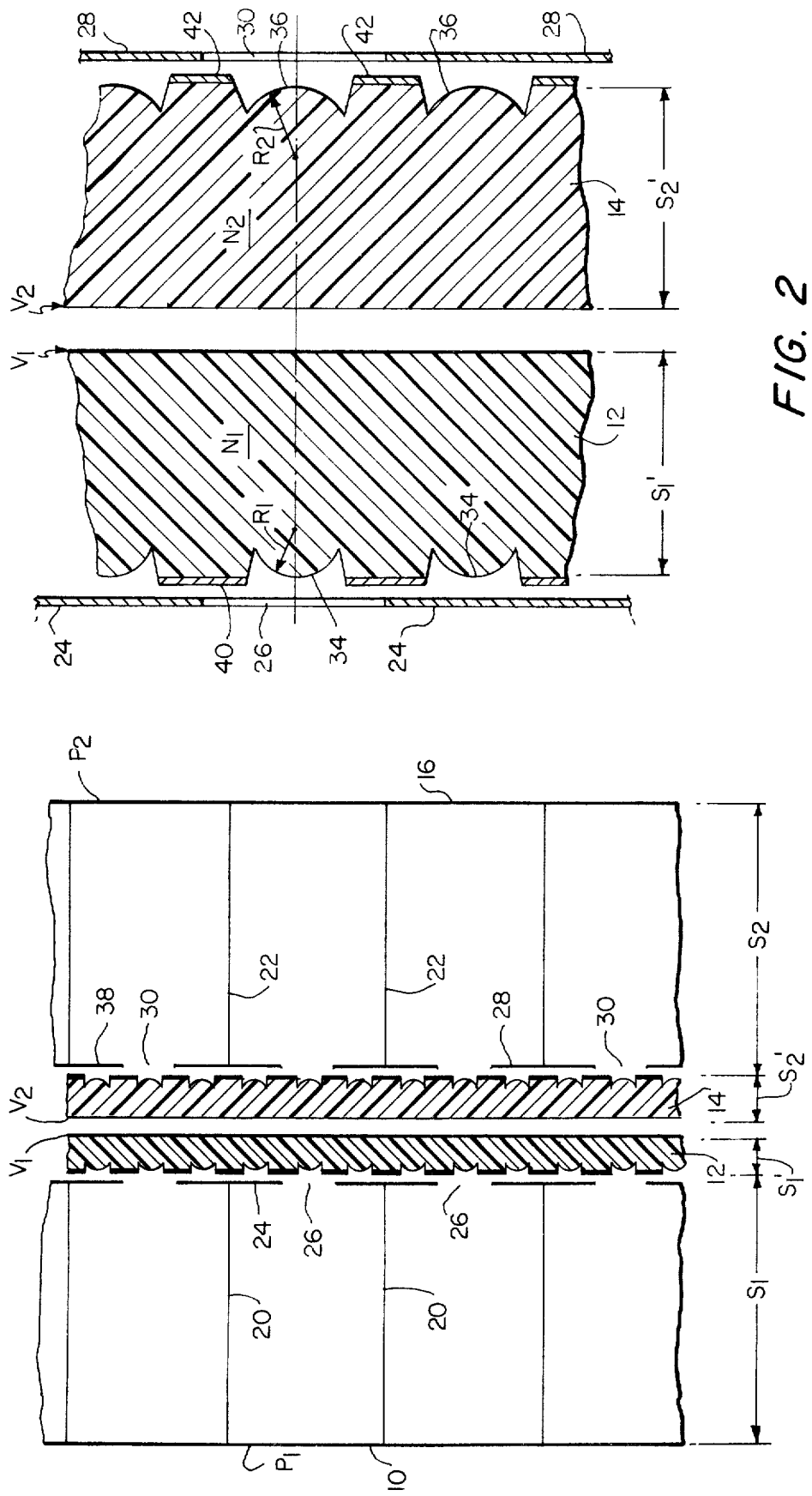

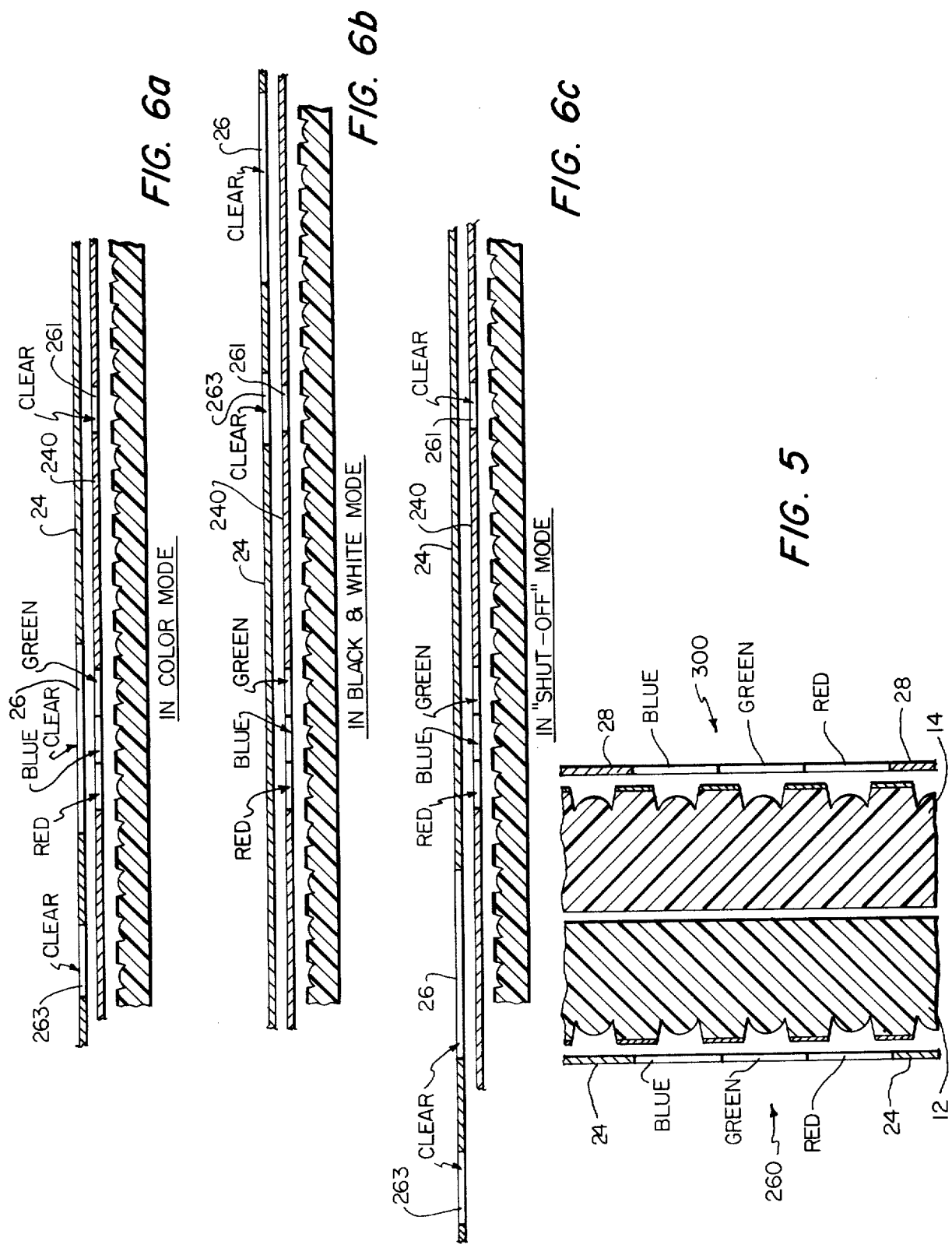

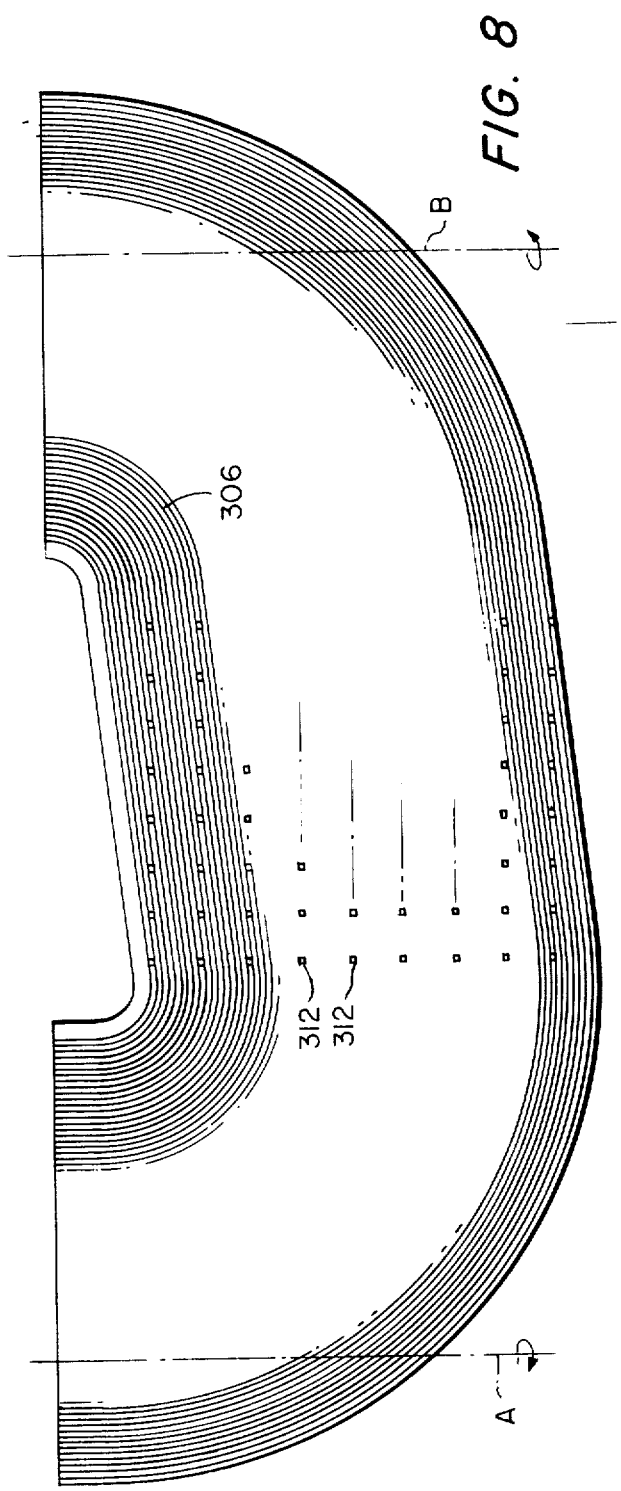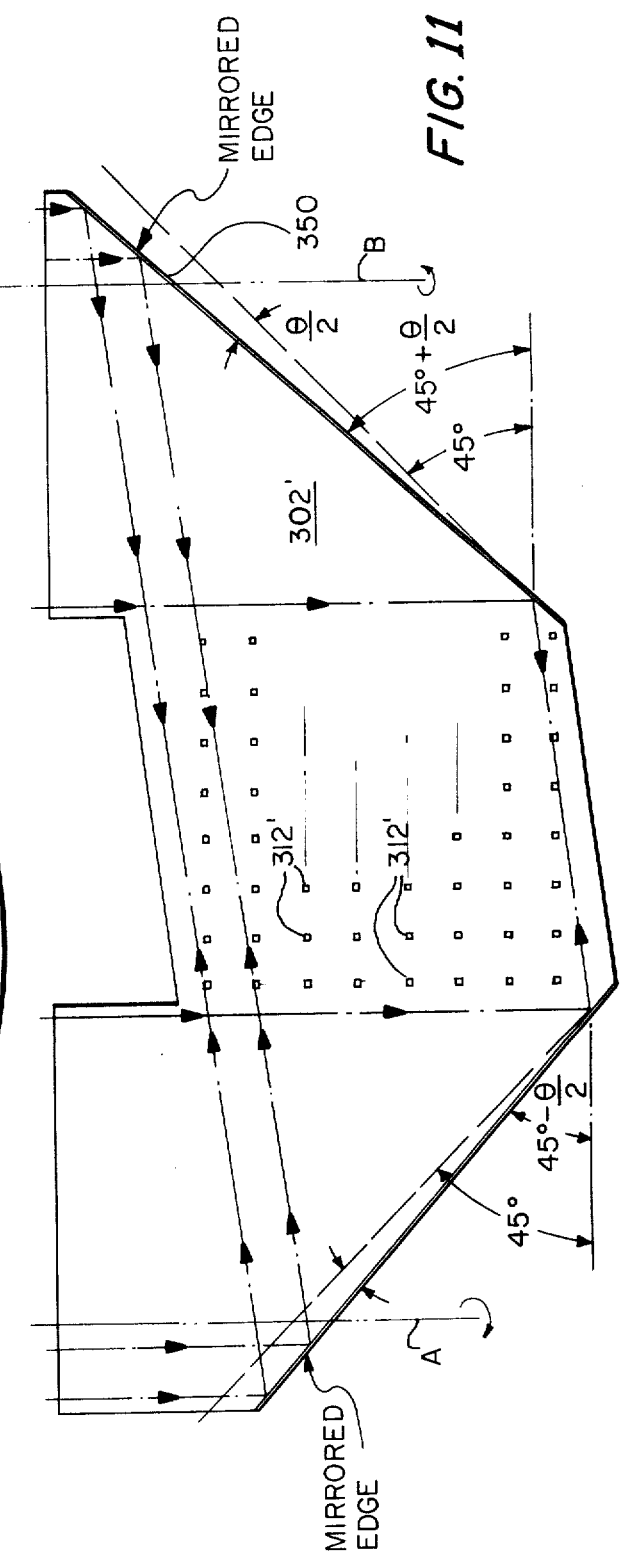

MULTIPLE FUNCTION RECORDING AND READOUT SYSTEM

This invention relates to an optical apparatus exhibiting plural functions for the recording and viewing of information. While many optical devices are known which perform various functions, there exists a need for a single optical apparatus to perform a plurality of functions. For example a camera performs the single function of imaging on a reduced scale the image of an object on a photographic emulsion which is later developed or fixed. A conventional optical projector performs the single function of projection and magnification of optical transparencies. A conventional office copying machine, to cite another example, performs the single function of making a reproduction on the same size or scale of an original placed on the copying machine. The optical apparatus of this invention, in distinction to the examples given, performs a plurality of optical functions.

The main element which makes possible the plural function capability of the apparatus is a lensfiche such as that described in my copending application Ser. No. 309,968 filed Nov. 28, 1972 now U.S. Pat. No. 3,864,034 issued Feb. 4, 1975 and entitled "Microfiche and Reader" herewith incorporated by reference. As disclosed in that application, the lensfiche is defined by a plate or sheet of transparent material such as methyl methacrylate and is provided on one surface with a photographic emulsion. The other surface is provided with a plurality of integral lenses, termed lensettes because of their small size. The lensettes are spaced from each other and the inter lensette surface is coated with an opaque substance. The lensfiche, in combination with suitable input apparatus for recording and output apparatus for readout is capable of forming the dual functions of recording and readout.

According to the practice of this invention, two such lensfiche elements are placed with their emulsion sides facing each other and with screen elements spaced from the lensette side of each, with each screen facing a lensette surface of each lensfiche. The four elements described are parallel to each other. Additionally, two sheet lighting elements may be added, making an ensemble of six basic elements. Both the four- and the six-element ensemble exhibit utility as a versatile recording and projection apparatus.

In the drawings:

FIG. 1 is a partial cross sectional view of the multiple function optional apparatus of this invention.

FIG. 2 is a view similar to a portion of FIG. 1 but on an enlarged scale.

FIG. 5 is a partial cross sectional view illustrating how color may be employed.

FIGS. 6a, 6b and 6c are partial cross sectional view illustrating three different modes.

FIG. 8 is a partially schematic view of a single embossed sheet prior to final assembly.

FIG. 11 is a view similar to FIG. 8, but consists of a single sheet wherein no embossed channels are required.

Figure 3:
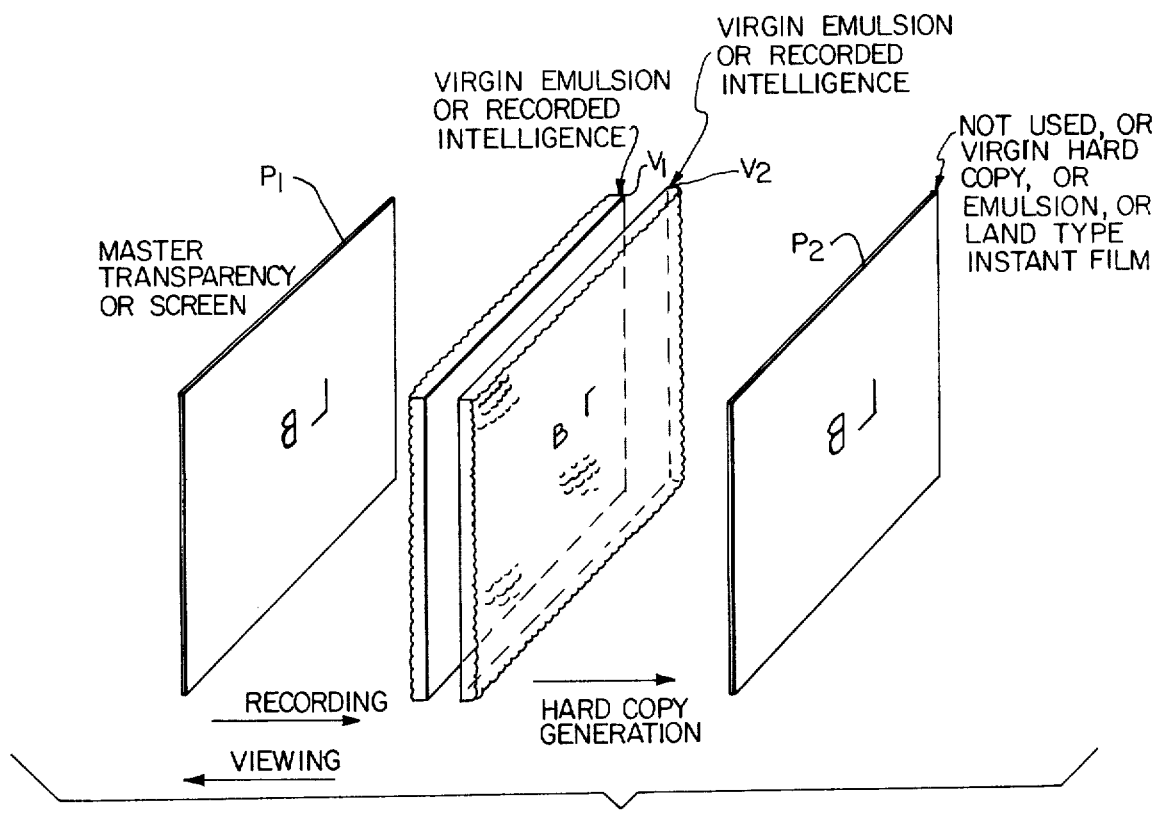
FIG. 3 is a view showing one mode of using the elements of FIG. 1.

Referring now to FIGS. 1 and 2 of the drawings, the numeral 10 denotes an optical screen positioned at a first plane denoted by $P_1$. The numerals 12 and 14 denote, respectively, lensfiche elements such as those described in my noted copending application. The numeral 16 denotes a screen similar to screen 10 and is located in a plane denoted by $P_2$. The facing emulsion-covered surfaces of lensfiche elements 12 and 14 lie, respectively, within planes denoted $V_1$ and $V_2$. The numerals 20 and 22 denote opaque septa defined by walls coated with a light-absorbing substance such as carbon black. The walls intersect each other to define cells open at their right and left ends. The numeral 24 denotes an opaque selector mask having openings 26 each aligned with one lensette of lensfiche 12, while the numeral 28 denotes a corresponding opaque selector mask having corresponding openings 30 each aligned with a lensette of lensfiche element 14. The lensfiche elements 12 and 14 are indexed individually if desired, so that one distinct set of lensettes of each is always aligned with corresponding openings 26 and 30. The numeral 34 denotes any one of the lensettes of radius $R_1$ of lensfiche 12, while the numeral 36 denotes any one of the lensettes of radius $R_2$ of lensfiche 14. The radii $R_1$ and $R_2$ may be equal or different. Similarly, the index of refraction for the respective lensfiche elements is denoted by $N_1$ for element 12 and $N_2$ for element 14. In general, they are the same but may be made unequal for certain applications. The numeral 40 denotes an opaque inter-lensette coating on the lensette side of lensfiche 12, while the numeral 42 denotes a corresponding opaque, interlensette coating on the lensfiche side of element 14.

The designations $S_1$ and $S_2$ denote the distances, respectively, from planes $P_1$ and $P_2$ to the lensettes, while their primed counterparts designate distance from the lensettes to their respective photographic emulsions, or, unemulsified surfaces if no emulsion is present for a particular mode.

The following table, designated as Table I, illustrates the several optical functions possible with the apparatus and also sets forth the several possible locations for each of the functions.

TABLE I

| EIGHT POSSIBLE FUNCTIONS AT PLANES $P_1$, $V_1$, $V_2$, $P_2$ | POSSIBLE LOCATIONS |
|---|---|
| 1. Screen (Rear Projection) | $P_1$, $P_2$ |
| 2. Master Intelligence (Transparency) | $P_1$, $P_2$, $V_1$, $V_2$ |
| 3. Virgin Emulsion | $P_1$, $V_1$, $V_2$, $P_2$ |
| 4. Recorded Micro-Intelligence | $V_1$, $V_2$ |
| 5. Hard Copy Production (Xerographic Process) | $P_1$, $P_2$ |
| 6. Optically Clear | $V_1$, $V_2$ |
| 7. Blank (Surface Not Utilized) | $P_1$, $V_1$, $V_2$, $P_2$ |
| 8. Master Intelligence (Opaque, e.g. Page of a Book) | $P_1$, $P_2$, |

In the event that the indices of refraction are identical, and if the radii of curvature of the lensettes of lensfiche elements 12 and 14 are the same, and if the image distances and if the object distances are the same, then the optical system is symmetric. Otherwise, if any of these four parameters is different the system is said to be non-symmetric.

Another table, designated as Table II, is set forth and represents an extensive list of modes of operation of the optical apparatus and system of this invention. The Table is particularly descriptive of modes of operation proceeding from the left-hand plane $P_1$ to the right-hand plane $P_2$.

TABLE II

| MODE | PLANE $P_1$ | DIFFERENT MODES OF OPERATION $V_1$ | $V_2$ | $P_2$ | COMMENTS |
|---|---|---|---|---|---|
| A | Master Transparency | Virgin Emulsion | Clear | Not Used | Microfiche Recording on Lensfiche |
| B | Master Transparency | Clear | Virgin Emulsion | Not Used | Microfiche Recording on Lensfiche |
| C | Viewing Screen | Recorded Micro-Intelligence From System A | Clear | Not Used | Hand-held Viewer as in DOLFIN |
| D | Viewing Screen | Clear | Recorded Micro-Intelligence from System B | Not Used | Hand-held Viewer as in DOLFIN |
| E | Master Transparency | Virgin Emulsion | Virgin Emulsion | Master Transparency | Two Separate Lensfiche Recordings |
| F | Viewing Screen | Recorded Micro-Intelligence from A or E | Recorded Micro-Intelligence from B or E | Not Used | Double Overlay |
| G | Viewing Screen | Recorded Micro-Intelligence from A or E | Recorded Micro-Intelligence from B or E | Viewing Screen | Two Separate Viewers |
| H | Not Used | Recorded Micro-Intelligence from A or E | Clear | Virgin Hard Copy, e.g.ZnO Paper or "Instant" Film | Hard Copy Production from Original Lensfiche, also Instant Print Production |
| I | Not Used | Clear | Recorded Micro-Intelligence from B or E | Virgin Hard Copy, e.g.ZnO Paper or "Instant" Film | Instant Print or Hard Copy Production from Lensfiche |
| J | Opaque Intelligence (e.g. cancelled checks) | Virgin Emulsion | Clear | Not Used | Micro-Recording Device of "Hard Copy" |
| K | Opaque Intelligence | Clear | Virgin Emulsion | Not Used | Micro-Recording Device of "Hard Copy" |
| L | Opaque Intelligence | Virgin Emulsion | Virgin Emulsion | Opaque Intelligence | Two Separate Micro-Recordings of "Hard Copy" |
| M | Virgin Hard Copy or "Instant" Film | Recorded Micro-Intelligence from J or L | Clear | Not Used | Hard Copy Production or Instant Print |
| N | Virgin Hard Copy or "Instant" Film | Clear | Recorded Micro-Intelligence from K or L | Not Used | Hard Copy Production or Instant Print |
| O | Virgin Hard Copy or "Instant" Film | Recorded Micro-Intelligence from J or L | Recorded Micro-Intelligence from K or L | Virgin Hard Copy or "Instant" Film | Two Separate Hard Copies or Instant Prints |
| P | Not Used | Recorded Micro-Intelligence from J or L | Clear | Viewing Screen | Hand-Held Microfiche Viewer |
| Q | Not Used | Clear | Recorded Micro-Intelligence from K or L | Viewing Screen | Hand-Held Microfiche Viewer |

Figure 4:
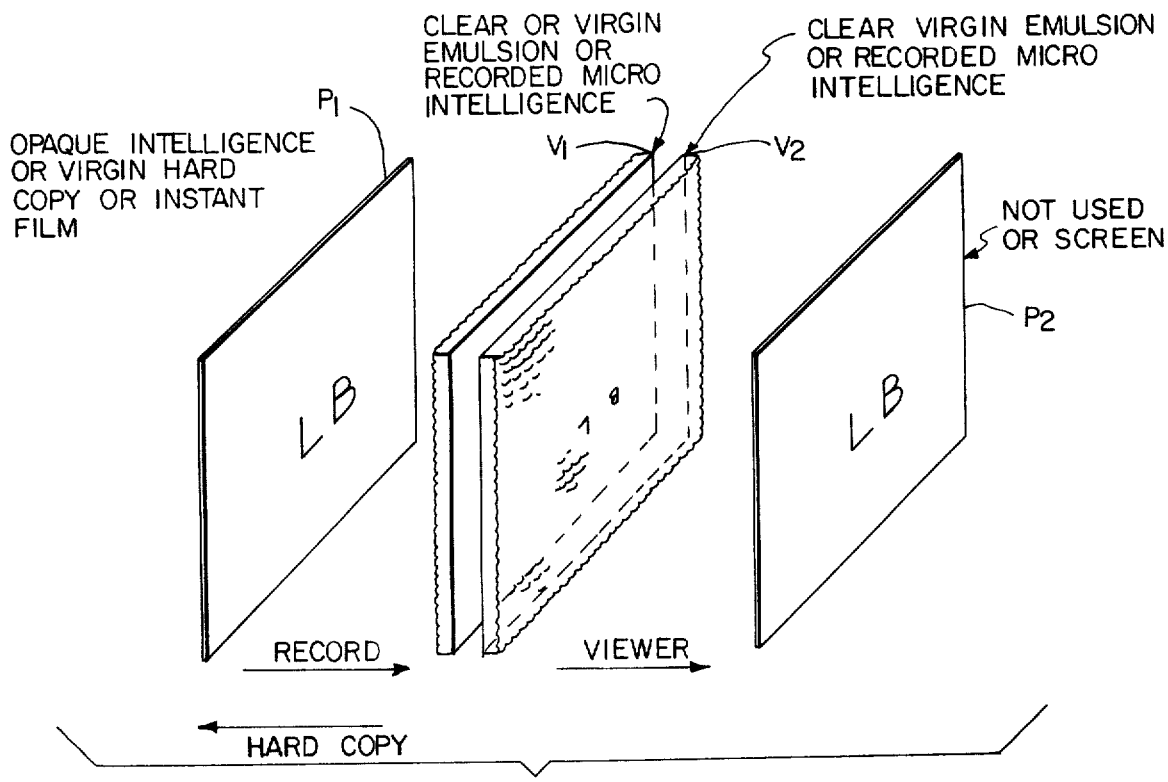
FIG. 4 is a view showing another mode of using the elements of FIG. 1.

Referring now to FIGS. 3 and 4 of the drawings, one set of possible functions of the optical system and apparatus of this invention is illustrated.

Referring now to FIG. 5 of the drawings, a modification is illustrated showing the use of colored filters for recording color on black and white film and/or viewing color using black and white film. The numerals 12, 14, 24 and 28 designate the same elements previously described. Opaque mask 24, in this embodiment, includes apertures 260 which are provided with blue, green and red filters as indicated. These filters may be placed in a row or may be angularly related as pie slices. The numeral 260 thus denotes apertures corresponding to openings 26 of the embodiment of FIG. 1, but with the three color filters as indicated. The same is true with respect to apertures 300 in opaque mask 28 which correspond to apertures 30 of the embodiment of FIG. 1. The filters shown are of the three primary colors; however, any desired wavelength filters may be employed. The construction and use of lensfiche elements such as 12, 14 for recording and viewing color scenes on black and white emulsion is fully described in my U.S. Pat. No. 3,824,609, entitled "Color Micro Optic Apparatus" herewith incorporated by reference. Briefly, each opening 26 in mask 24 (or 28) now exposes a triad of lensettes, instead of a single lensette, with each lensette of the triad associated with a different color filter. It will be observed that any of the several operations set out in Table II or the inverse (going in the opposite optical direction) may also be carried out with the construction of FIG. 5.

Referring now to FIGS. 6a, 6b and 6c of the drawings, an arrangement is illustrated employing either one of the lensfiche elements 12 or 14 and its corresponding mask 24 or 28, together with an additional opaque mask 240 having color filters, the mask inserted or positioned between the lensettes and the opaque mask 24. Referring now to FIG. 6a, the color mode is illustrated. The mask 24 is provided, as previously, with openings 26 while color opaque mask 240 is provided with the indicated color filters. Additionally, mask 240 is provided with openings 261. The openings 26 of mask 24 are aligned with the color filters of mask 240 so as to provide an optical path from the object being recorded to the lensettes through the color filters. As shown in FIG. 6b, for the black and white mode of operation, the masks 240 and 24 are moved relative to each other so as to block off the color filters, while retaining optical access for either projection or recording through the lensettes. The access is through apertures 263 of mask 24 and aperture 261 of mask 240. At FIG. 6c, the two masks 24 and 240 are so positioned that all optical access is cut off to the lensettes.

It will be observed that the openings in mask 24 in FIGS. 6a, 6b and 6c are of two sizes. The first size is large enough to accommodate the color filters on the mask 240 immediately beneath it. The second opening 263 is smaller and is the approximate size of the noncolor filter openings 261 of lower mask 240.

Figure 7:
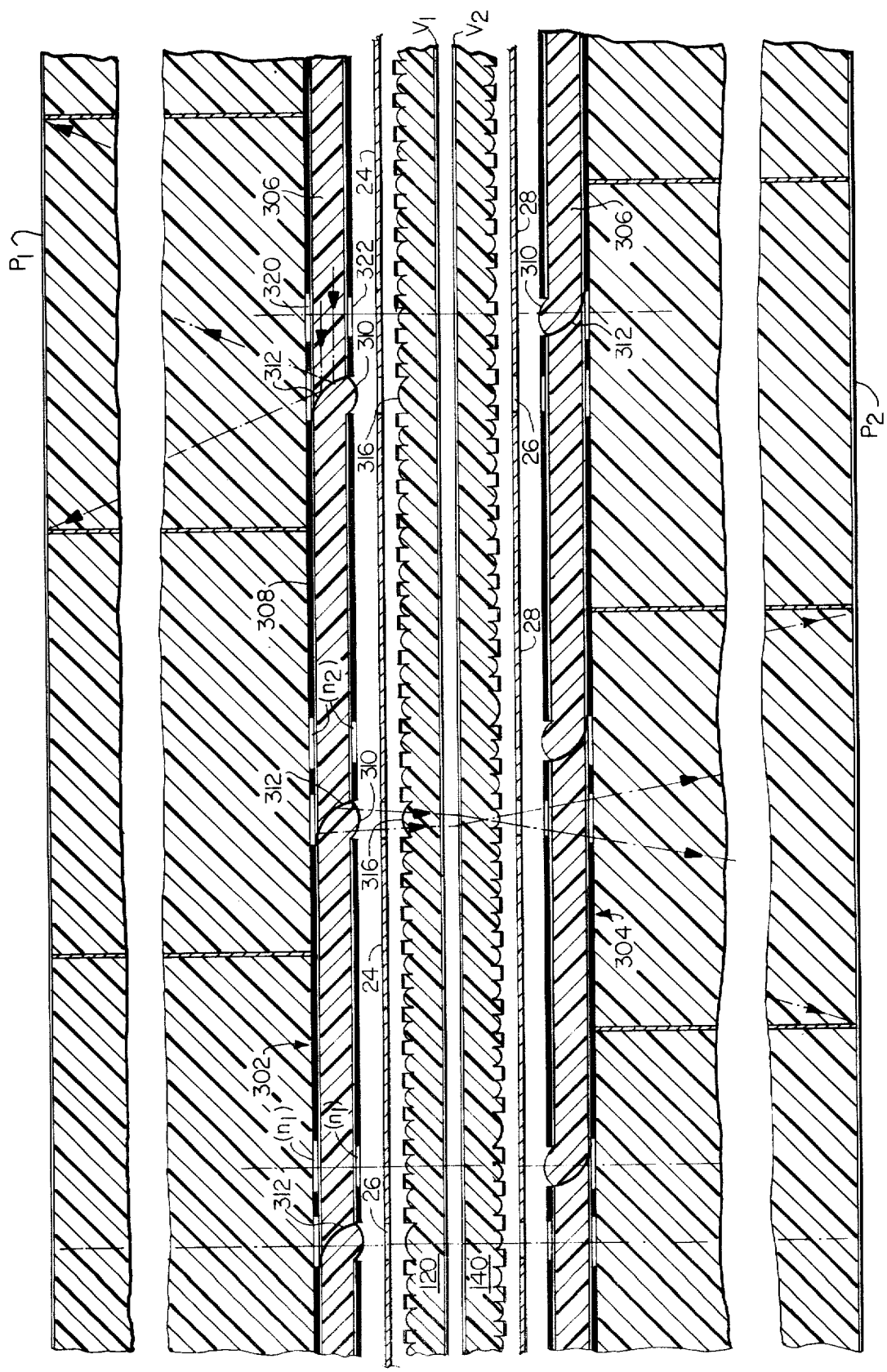
FIG. 7 is a partial cross section of the lighting arrangement of an embodiment wherein illumination is effected by sheet lighting elements.

A consideration of Table II illustrates the need of proper lighting in several of the instances, as for example upon the readout of recorded micro-intelligence such as modes C, D, F, G, etc. Another instance wherein the problem of lighting arises is in recording from opaque intelligence such as a colored print, a cancelled check, a page of a book (e.g. modes J. K. L). FIG. 7 of the drawings illustrates a modification of the apparatus of FIGS. 1 and 2 and includes, as additional components, lighting sheets similar to that disclosed and described at FIGS. 8 through 16 inclusive of my noted copending application Ser. No. 309,968. Each lighting sheet is defined by embossed members of a plate. Such a sheet is indicated by the numeral 302 in FIG. 7 for the top sheet and 304 for the bottom sheet. Each lighting sheet 302, 304 includes a central portion 306 fashioned from a transparent material such as methyl methacrylate which has been embossed on both sides to define longitudinal channels and which is of an index of refraction $n_2$. Both sides of the embossed sheet are coated with a material having index of refraction $n_1$, with the index $n_2$ being greater than the index $n_1$. On top of these coatings, an opaque coating denoted by the numeral 308 is placed. Numeral 310 denotes the enlarged ends of each of the light conducting channels of the plates 302, 304. Illuminating light, as from a light bulb, passes through the channels 306 and onto reflecting portions 312. The exits 310 and lenses 316 both function as focusing elements.

As may be seen from the top lighting sheet member 302 of FIG. 7, light passing therethrough from the left to the right strikes the several reflecting portions 312, passes through convex portions 310 and focusing elements 316, thence downwardly through the clear emulsion (if any) at plane $V_1$ of lensfiche 120, thence through the micro images on the emulsion of microfiche 140 at plane $V_2$, thence to a corresponding lensette of lensfiche 140, thence onto the viewing screen 16 at plane $P_2$. In one specific example, the termini 310 are positioned coincident with the corners of squares 100 mils on a side.

In the event that light enters from right to left on the top sheet lighting element 302 of FIG. 7, for a different mode such as mode J, it strikes the convex portions of reflecting elements 312 (as distinguished from the concave portions in the case just described) and passes upwardly through transparent plastic (or air) between planes $V_1$ and $P_1$ and illuminates the screen positioned at plane $P_1$. In this case, the illumination at plane $P_1$ is employed to illuminate opaque matter, such as a cancelled check which is positioned at plane $P_1$. Recordation is made through openings 320 and 322 to emulsion of lensfiche 120 at $V_1$. It will be understood, in such a mode, that plate 24 is moved so that its apertures 26 coincide with apertures 320 and 322.

Again referring to FIG. 7, in the event light enters from the left to the right of the lower light sheet element 304, it strikes the convex reflecting portions of reflectors 312 and passes down and illuminates an opaque object such as a cancelled check or the page of a book placed there. Recordation is made in a manner just described, i.e. the action is symmetric with respect to elements 302 and 304. The same is true when light is entering the lower element 304 from right to left where it is reflected from the concave sides of curve portions 312. The masks 24, 28 and lensfiche element 120 and 140 are movable relative to each other and to the screens.

Figure 9:
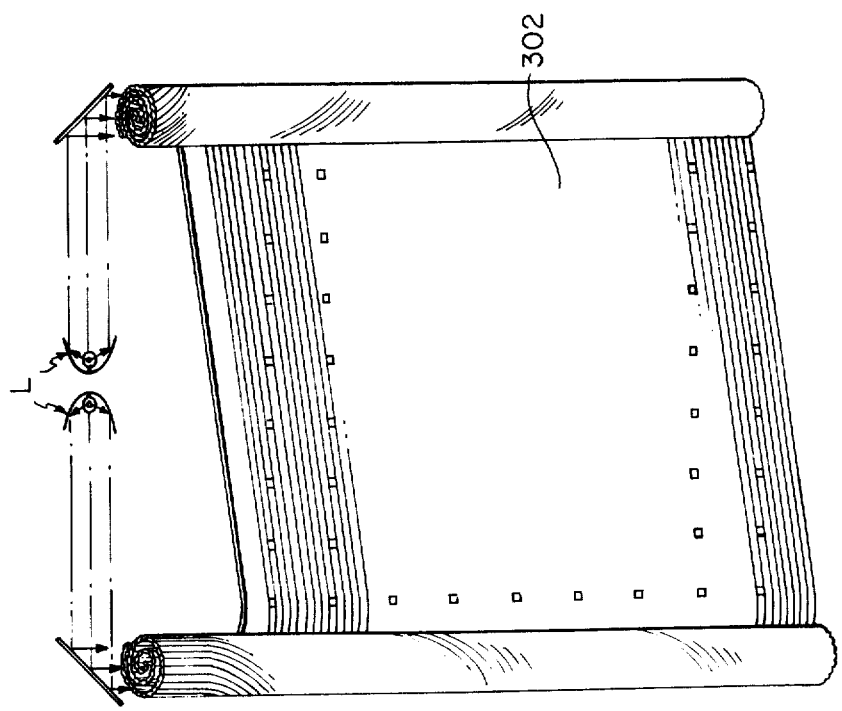
FIG. 9 is a view illustrating the sheet of FIG. 8 after it has been rolled up in final form.

Reference now to FIGS. 8 and 9 will illustrate the manner of construction of (identical) sheets 302 and 304. At FIG. 8, sheet 302 of plastic such as methyl methacrylate is embossed in a manner indicated to thereby form lightconducting channels 306. The reflecting surfaces 312 are indicated at FIG. 8 and are formed by suitably embossing, as by oppositely directed punches having the desired convex and concave mating surfaces, to form the reflecting surfaces 312 indicated at FIG. 7. Thereafter, sheet 302 (having an index of refraction $n_2$) is coated with a material having an index of refraction $n_1$ on both sides, with the index $n_2$ being greater than the index $n_1$. As a next step, the top and bottom surfaces of sheet 302 are coated by the opaque material 308, with the positions wherein apertures 320, 322 are located not coated, as well as the locations of focusing elements 310 and the side of the sheet associated with the convex side of reflectors 312. As a final step, sheet 302 is rolled at its end about axes A and B so as to arrive at the configuration shown in FIG. 9. The upper rolled ends function as light-receiving channels from a source of illumination denoted generally by the letter L and the indicated reflecting surface. Light entering the rolled ends will pass along the channels 306, being internally reflected, and will strike surfaces 312. In practice either one or the other (left or right) rolled ends are illuminated, depending upon the desired direction of light.

Figure 10:
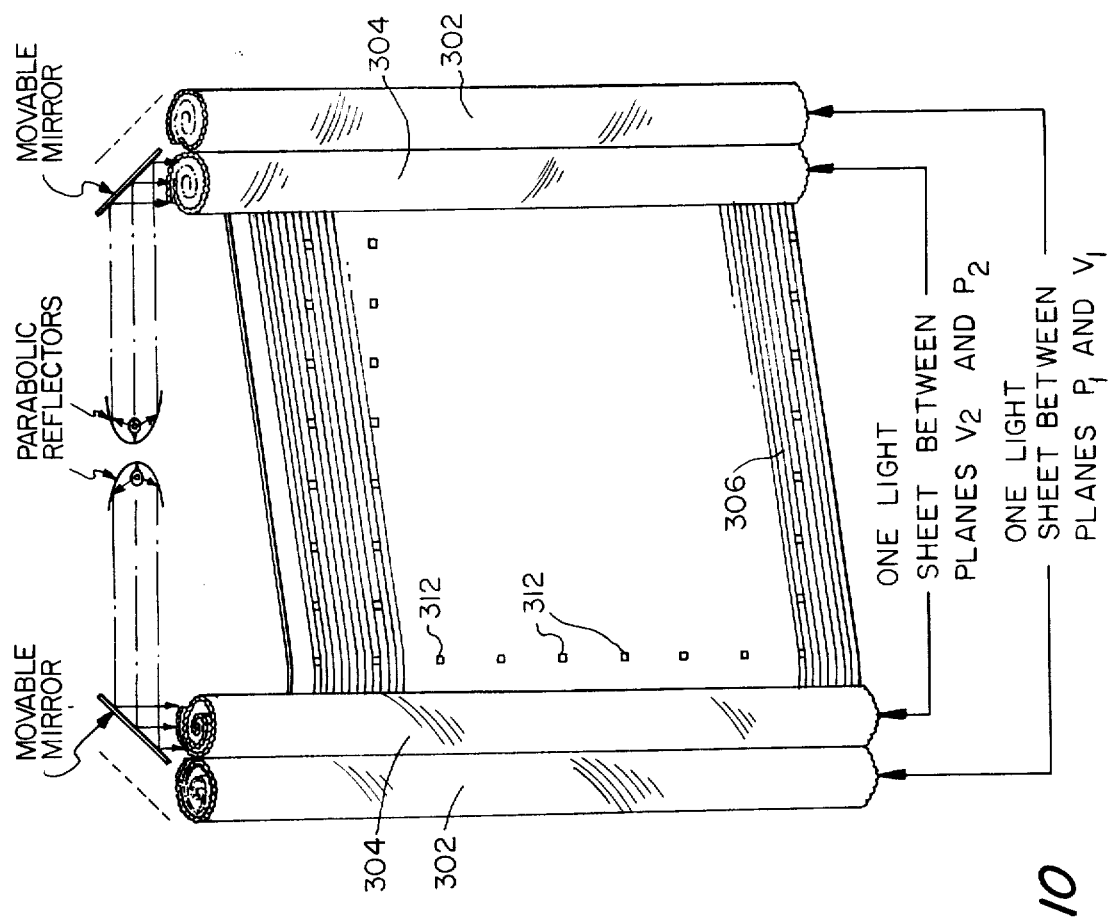
FIG. 10 illustrates two illumination sheets, one positioned between planes $P_1$ and $V_1$ and the other positioned between planes $P_2$ and $V_2$.

Referring now to FIG. 10 of the drawings, the reader will observe that the same procedure is followed with respect to the other sheet 304, with the two sheets being assembled as indicated in FIG. 9 to thereby define the construction of FIG. 7.

Referring now to FIG. 11 of the drawings, another embodiment is illustrated, similar to FIG. 8. However, no embossing to define the longitudinal channels 306 is required. The numeral 302' denotes a plastic sheet similar to sheet 302 but having angled edges 350 coated with a reflecting material. Again, the sheet 302' is coated with an index of refraction $n_1$ of smaller index than $n_2$, the index of the sheet 302'. The sheet is again rolled around axes A and B as indicated for the purpose of arriving at the final configuration illustrated in FIG. 12. The indicated paths of light at FIG. 11 show that selected reflecting elements 312' will be positioned, in the example given, at the edges of squares 100 mils on a side. Reflecting surfaces 312' reflect from both sides, and may be formed by embossing sheet 302' with punches.

Figure 12:
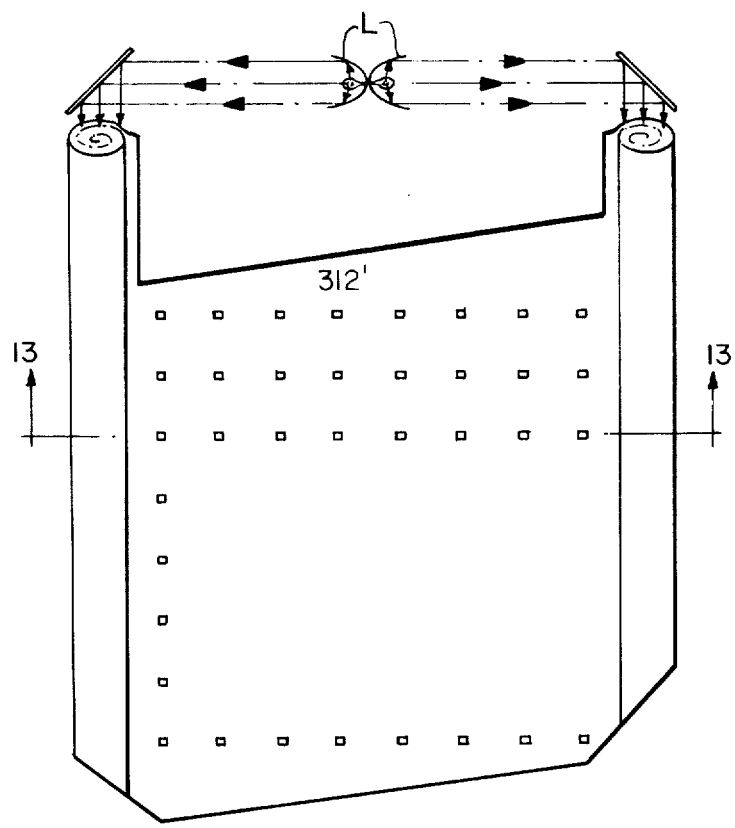
FIG. 12 is a view similar to FIG. 9, but illustrating the final form of the sheet of FIG. 11.
Figure 13A:
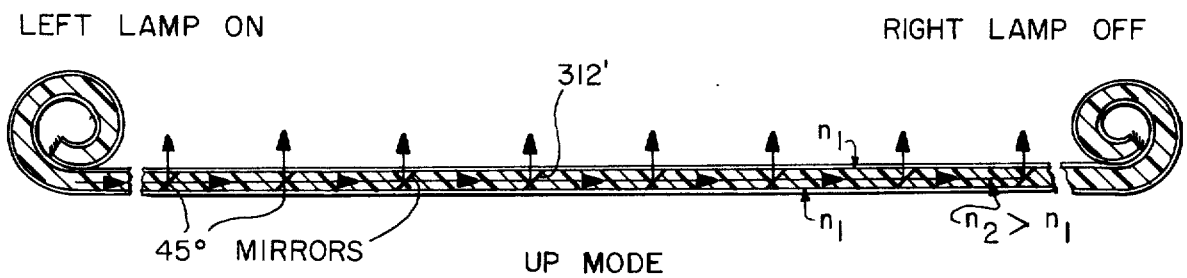
FIGS. 13a and 13b are taken along line 13—13 of FIG. 12.
Figure 13B:
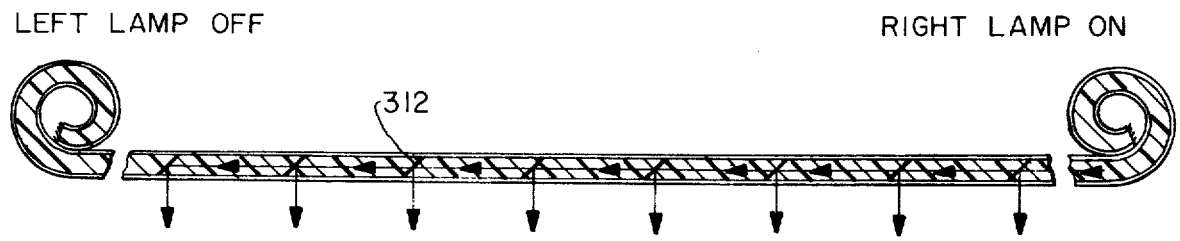

The operation is illustrated at FIGS. 13a and 13b of the drawings where the arrows indicate the several directions of travel of the light and their impingement upon reflecting elements 312'. The reader will note that in lieu of curved reflecting elements 312 having convex and concave opposite sides, mirrors 312' of the embodiment of FIGS. 11 and 12 are flat.

It will be noted that the screens 10 and 16 must change their properties, depending upon the mode of operation. For example if a hard copy is placed on a screen for recordation, then the screen must be clear. If, however, projection against screen 10 is called for, then it must be of the light scattering type. Alternatively, a screen may be capable of both functions, although at some cost in optical quality.

The embodiment of FIG. 7 illustrates the lighting sheets for the inverse of mode C of Table II. That is to say, the micro-intelligence is located at plane $V_2$ and is viewed upon screen 16 at plane $P_2$. The emulsion at plane $V_1$ of lensfiche 120 is clear and plane $P_1$ is not employed. In the event that hard copy (a page of a book) is placed on the screen at $P_1$, and zinc oxide copy paper is placed at the other screen at plane $P_2$, copying at a magnification of unity is carried out. In such a mode, no emulsion is required at planes $V_1$ or $V_2$.

The systems described above may also be employed for recording and/or viewing motion pictures, i.e., animation. Several such modes are set forth in Table III. For the animation modes the lensfiche elements 12 and 14 are replaced by flexible counterparts capable of being wound and unwound from a spool. Either black and white or color may be employed.

TABLE III

SOME MODES OF OPERATION OF NEW MUTLI-PURPOSE OPTICAL SYSTEM WHEREIN ANIMATION PREVAILS

| MODE | PLANE $P_1$ | $V_1$ | $V_2$ | $P_2$ | COMMENTS |
|---|---|---|---|---|---|
| A' | Animation Projected Onto Screen | Virgin Emulsion | Clear | Not Used | Movie Recording on Lensfiche |
| B' | Animation Projected Onto Screen | Clear | Virgin Emulsion | Not Used | Movie Recording on Lensfiche |
| C' | Viewing Screen | Continuous or Stepped Motion of Micro-Intelligence | Clear | Not Used | Hand-Held, Large-Area Movie Viewer |
| D' | Viewing Screen | Clear | Continuous or Stepped Motion of Micro-Intelligence | Not Used | Hand-Held, Large-Area Movie Viewer |
| E' | Animation Projected Onto Screen | Virgin Emulsion | Virgin Emulsion | Animation Projected Onto Screen | Movie Recording Plus Stationary Scene or Stationary Intelligence Superimposed on Animation |
| F' | Animation Projected Onto Screen | Virgin Emulsion | Virgin Emulsion | Animation Projected Onto Screen | Movie Recording on Two Separate Lensfiches |
| G' | Viewing Screen | Continuous or Stepped Motion of Micro-Intelligence | Continuous or Stepped Motion of Micro-Intelligence | Not Used | Hand-Held Movie Viewer With Double Overlay |
| H' | Not Used | Recorded Animated Micro-Intelligence from A' or E' | Clear | "Instant" Film or Virgin Hard Copy, e.g. ZnO | Hard Copy Production from "Movies" |
| I' | Not Used | Clear | Recorded Animated Micro-Intelligence from B' or E' | "Instant" Film or Virgin Hard Copy, e.g. ZnO | Hard Copy Production from "Movies" |
| J' | Opaque Intelligence, e.g. | Virgin Emulsion | Animated Micro-In- | Viewing Screen | Recorder (Micro) and Hand-Held Movie |

TABLE III-continued

SOME MODES OF OPERATION OF NEW MUTLI-PURPOSE OPTICAL SYSTEM WHEREIN ANIMATION PREVAILS

| MODE | PLANE $P_1$ | $V_1$ | $V_2$ | $P_2$ | COMMENTS |
|---|---|---|---|---|---|
| | Cancelled Checks | | telligence | | Viewer |
| K' | Opaque Intelligence | Virgin Emulsion | Virgin Emulsion | Continuous or Stepped Animated Master Intelligence | Simultaneous Micro-Recording of Hard Copy and Movies |
| L' | Virgin Hard Copy or "Instant" Film | Recorded Micro-Intelligence from J or L | Continuous or Stepped Micro-Intelligence | Viewing Screen | Hard Copier Plus Compact Hand-Held Movie Viewer |
| M' | Virgin Hard Copy or "Instant" Film | Recorded Micro-Intelligence from J or L | Continuous or Stepped Micro-Intelligence | Virgin Hard Copy or Instant Film | Two Separate Hard Copiers or Instant Prints from "Movies" |
| N' | Viewing Screen | Continuous or Stepped Micro-Intelligence | Continuous or Stepped Micro-Intelligence | Viewing Screen | "Double Feature" |

What is claimed is:

1. A plural-function optical apparatus, including,
   a. a first optical screen,
   b. a first lensfiche whose lensettes face said first screen, said first lensfiche being parallel to said first optical screen,
   c. a second lensfiche, parallel to said first lensfiche, whose emulsion side faces the emulsion side of said first lensfiche,
   d. a second optical screen, parallel to said second lensfiche, on the same side of said second lensfiche as the latter's lensettes.
   e. two sets of septa each defined by opaque, intersecting walls, said intersecting walls defining openended cells, said septa walls being orthogonal to said optical screens, one septa set extending between said first optical screen and said first lensfiche, the other septa set extending between said second lensfiche and said second optical screen,
   f. two apertured, planar selector masks, each mask positioned contiguous to the lensettes of, respectively, said lensettes, and each mask lying between its contiguous lensettes and one end of the cells of a septa set,
   g. each aperture of said selector masks opening onto a single associated lensette of a corresponding lensfiche, each aperture lying at one end of a septa cell, there being one mask aperture for each septa cell, the remaining lensettes being covered by said selector masks.

2. The apparatus of claim 1 wherein each aperture of at least one selector mask is provided with a plurality of color filters of different colors, and wherein each color filter is aligned with a different lensette of the lensfiche of said at least one selector mask, whereby each aperture of said at least one selector mask opens onto three adjacent lensettes.

3. The apparatus of claim 2 wherein only one of said lensfiche elements is provided with an emulsion.

4. The apparatus of claim 1 wherein only one of said lensfiche elements is provided with an emulsion.

5. The optical apparatus of claim 1, including,
   a. a sheet of transparent material having an index of refraction $N_2$,
   b. a first coating on both sides of said sheet having an index of refraction $N_1$ less than $N_2$,
   c. said sheet having a plurality of light-conducting channels over its surface,
   d. a reflector positioned in each said channel at approximately 45°, whereby light passing along one of the channels is reflected out from the channel in a direction normal to the sheet, said reflectors being positioned over the surface of said sheet,
   e. a second, opaque coating on both sides of said sheet and superposed on said first coating, said opaque coating being apertured on both sides at the said reflectors, and also being apertured on both sides adjacent each said reflector,
   f. a light-conducting sheet positioned parallel to and adjacent each said selector mask on the side thereof facing its associated screen.

* * * * *